Nov. 22, 1938. H. F. TÖNNIES 2,137,466
PHOTOELECTRIC PHOTOMETER
Filed Nov. 19, 1935 3 Sheets-Sheet 2

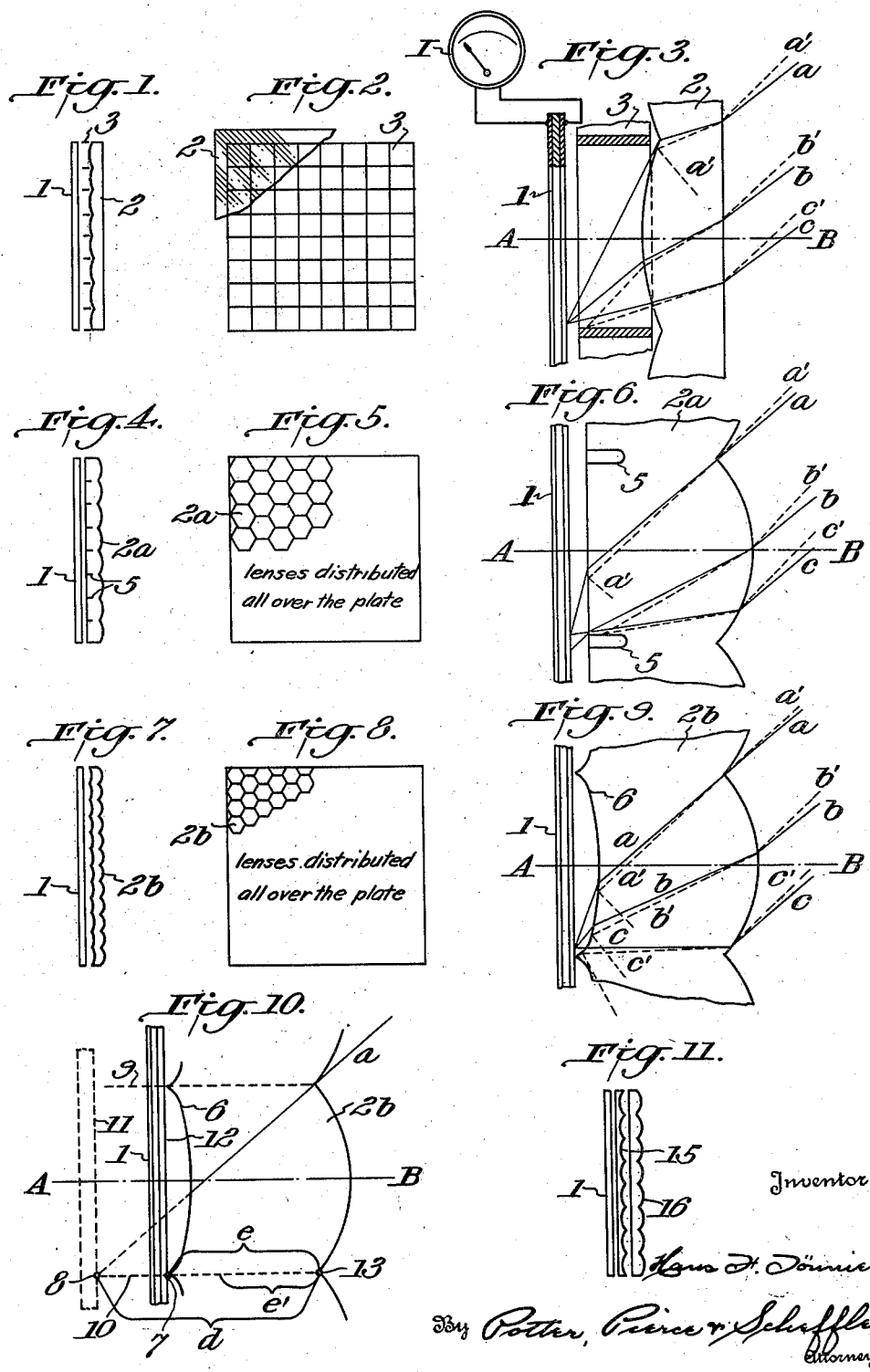

Inventor:
Hans F. Tönnies,
By Potter, Pierce & Scheffler,
Attorneys.

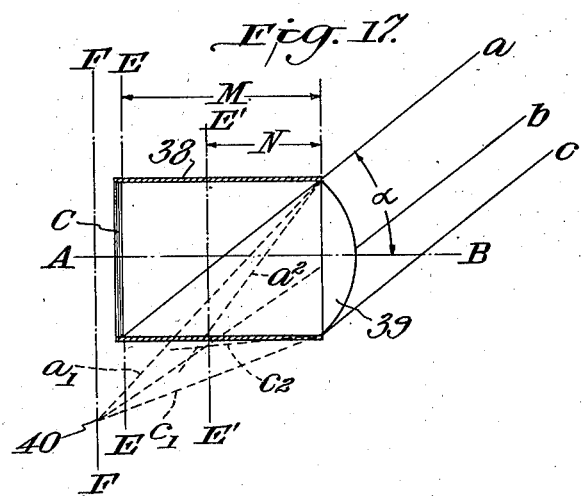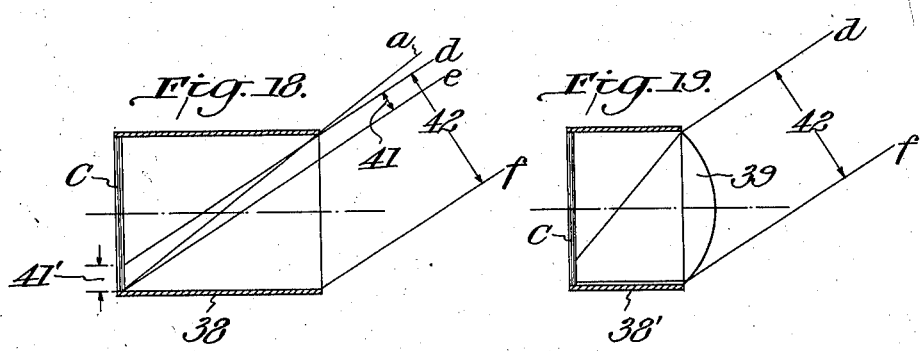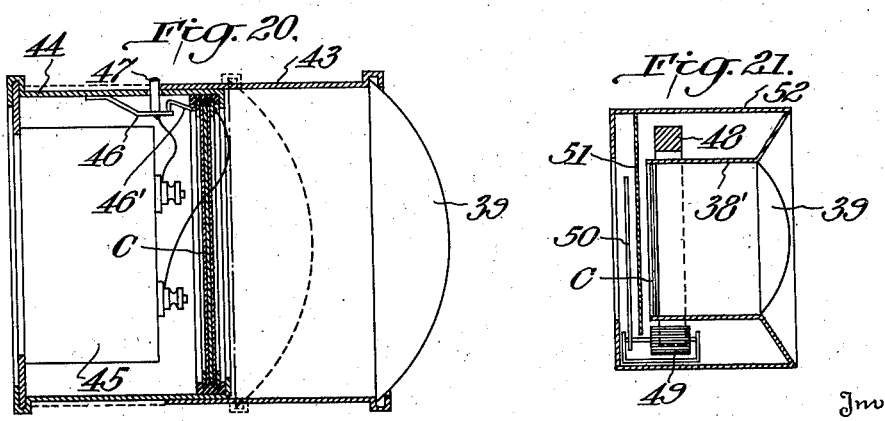

Patented Nov. 22, 1938

2,137,466

UNITED STATES PATENT OFFICE

2,137,466

PHOTOELECTRIC PHOTOMETER

Hans Ferdinand Tönnies, Grossflottbek, near Hamburg, Germany

Application November 19, 1935, Serial No. 50,596
In Germany June 6, 1933

9 Claims. (Cl. 88—23)

The present invention relates to photoelectric photometers, that is to say photometers which are provided with a photoelectric cell connected to a galvanometer and which serve the purpose of measuring the intensity of the light included in a cone or fan of light rays having a definite magnitude. The invention is particularly advantageously applicable for photometers having a photoelectric cell which automatically converts light energy into electric energy without the aid of an electric battery. The invention can be employed for all photometers serving for the measurement of the intensity of the ray included in a cone of light rays as aforesaid, for example for photometers by means of which the time of exposure for taking photographs is estimated.

In order to measure only the intensity of those light rays which are included in a cone having a definite magnitude, it is necessary to arrange in front of the photoelectric cell some form of screen or stop which cuts off or screens off from the photoelectric cell all the rays which form a larger angle with the axis, i. e., which emanate from a point located too far on one side. For this purpose, it has hitherto been proposed to employ an open front chamber or a number of such chambers located side by side, arranged in front of the photoelectric cell. It has been proposed to use a lens similar to a camera lens to form upon the cell an image of the scene to be photographed.

These prior systems for restricting the angular spread of the active light rays have complicated the problem of producing a photometer which satisfied the conflicting design requirements of small size and high sensitivity. The cost of a wide angle lens of short focal length for focusing the scene upon the cell is prohibitive, and a lens of small aperture reduces the sensitivity by blocking off useful light rays. The size of the apparatus increases with the focal length of the image-forming lens and, so far as I know, there has been no commercial use of such lenses in a photometer. The multiple chamber baffle system can be so designed as to add little or nothing to the size of a photocell and measuring instrument combination, but the walls of the chambers intercept a material part of the light rays that fall within the desired light beam and thus reduce the sensitivity of the photometer.

An object of this invention is to provide a small and efficient photometer of the type including a cell, a measuring instrument and a lens or optical system for restricting the angular spread of the cone of light which reaches the cell.

An object is to provide a photometer in which an optical system and a mechanical baffle system cooperate to restrict the active light rays to a predetermined angular spread, the systems being so related as to combine the advantages of small size and high sensitivity. Further objects are to provide photometers including light-restricting systems in the form of one or more units, each unit comprising a baffle chamber and an associated lens; the multiple unit constructions being either spaced units or a multiple chamber baffle and a multiple lens plate. A further object is to provide a photometer or exposure meter incorporated in a camera, the light-restricting system comprising a plurality of separate cell, baffle chamber and lens units located in "dead" spaces within the camera box and all associated with a single measuring instrument.

Further specific objects are to provide small compact photometers that include a cell, a measuring instrument, and a single baffle chamber and non-aplanatic lens for restricting the angular spread of the active light rays.

These and other objects and advantages of the invention will be apparent from the following specification when taken with the accompanying drawings, in which:

Figs. 1 to 9 are somewhat diagrammatic views illustrating three forms of the invention in which a multiple lens plate forms, or forms part of, the light-restricting system of a photometer;

Fig. 10 is a diagrammatic view illustrating the increase of light intensity at the cell which is obtained through use of the invention;

Fig. 11 is a diagrammatic side view of another form of multiple lens system embodying the invention;

Figs. 17, 18 and 19 are diagrammatic views of a single baffle chamber and single lens construction; and Figs. 20 and 21 are sectional views of photometers that include light-restricting elements such as shown in Figs. 17 to 19.

Figure 12:
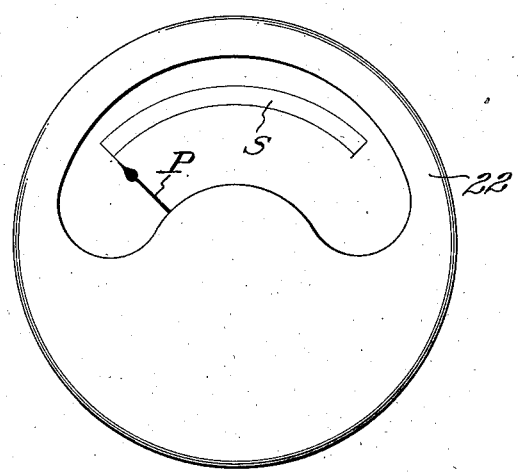
Fig. 12 is an end elevation of an exposure meter embodying the invention.

In the constructional form illustrated in Figs. 1 to 3, a lens plate 2 and a screen or multiple chamber baffle 3 are arranged in front of a photoelectric cell 1 which, preferably, is of the barrier layer or current-generating type, and has the terminals thereof connected directly to a sensitive current measuring instrument I. The front surface of the lens plate is plane, and the rear surface is made up of a number of lens surfaces located adjacent to one another and alined with the individual chambers of the screen 3. As shown in Fig. 2, the chambers are in this construction of quadrangular form.

By means of the lens surfaces of the plate 2 in combination with the walls of the chambers the result is obtained that all the rays of light which have an angle of incidence exceeding a definite permissible angle are prevented from reaching the photoelectric cell. The magnitude of the permissible angle is preferably such as to agree approximately with the angle of the image of an ordinary photographic camera, so that only those rays can reach the photoelectric cell which would also act to the film in the camera, while all rays having a greater angle of incidence are kept away from the photoelectric cell in order to prevent faulty indications of the time of exposure.

Fig. 3 illustrates the optical cooperation of the lens plate and the chambers. The light rays, $a$, $b$ and $c$ represent those rays of light which have the greatest inclination to the axis A—B permissible for allowing their admission to the photoelectric cell. The said rays may, for example, be at an angle of 39 to the said axis A—B. The ray $a$ is very considerably refracted by the rear surface of the lens plate according to the sine law, while the ray $b$ is refracted to a lesser extent and the ray $c$ to a still lesser extent. These rays do not strike the chamber walls but are admitted to the photoelectric cell. The rays $a'$, $b'$, and $c'$ form a somewhat larger angle with the axis A—B, for example 40°. The curvature of the lens surfaces in relation to (1) the index of refraction of the transparent material of which the lens plate is composed, and (2) the distance of the front surface of the lens plate from the photoelectric cell is made such that the rays $a'$, $b'$ and $c'$ cannot strike upon the photoelectric cell, inasmuch as they are either totally reflected from the lens surfaces, as indicated for the ray $a'$, or fall upon the partition wall of a chamber and are screened off by this latter, as indicated for the rays $b'$ and $c'$.

The lenses and chambers are preferably made of hexagonal shape, inasmuch as this shape is the one (when a number of shapes are to be arranged adjacent to one another) which approximates most closely to the circular shape, and inasmuch as the angles are better illuminated than in the case of shapes having fewer and consequently more acute angles. In the constructional form shown in Figs. 4 to 6 there is arranged in front of the photoelectric cell a lens plate 2a, the front side of which is provided with curved lens surfaces, while the rear side is flat. In the said rear side the depressions 5 are formed by pressing, which depressions may be filled with a material non-transparent to light. The optical effect obtained is illustrated in Fig. 6. The rays $a$, $b$ and $c$ are at the permissible angle to the axis A—B. The ray $a$ is again very highly refracted according to the sine law from the rear side of the plate 2a, while the rays $b$ and $c$ are less strongly refracted. The rays $a'$, $b'$ and $c'$ are at an angle which exceeds the permissible one and are accordingly either totally reflected by the rear surface of the lens plate or trapped by the intermediate partitions 5.

The constructional form which is the most important one in practice is illustrated in Figs. 7 to 9. In this constructional form, the lens plate 2b is provided both on the front side and also on the rear side with lens surfaces. If the curvatures of the lens surfaces on the front and rear sides respectively are correctly calculated, of course, taking into consideration the distance of the peaks of the lens surfaces from one another and the index of refraction of the plate, the result can be attained that nearly all the rays which make a greater angle with the axis A—B than the permissible one are totally reflected from the rear side of the plate and do not reach the photoelectric cell.

The rays $a$, $b$ and $c$ are at a permissible angle to the axis A—B of, for example, 39°, and, after being strongly refracted by the surface 6, reach the photoelectric cell. The rays $a'$, $b'$ and $c'$, on the other hand, exceed the permissible angle by, for example 1° and are consequently totally reflected by the surface 6 so that they cannot reach the photoelectric cell.

By means of the above-described arrangements, a substantially increased illumination of the photoelectric cell and consequently an increase of the efficiency of the photometers are obtained, so that measurements may, for example, be carried out even in comparatively dark places. The cause of this effect is illustrated diagrammatically in Fig. 10.

The light ray $a$ is refracted by the surface 6 in such manner that it arrives at the point 7. As is shown in Fig. 9 the incident ray having a greater angle of inclination is totally reflected. If the lens plate 2b were not provided the ray would arrive at the point 8. In order to screen off incident rays of greater inclination from the photoelectric cell, paritions 9, 10 would have to be provided. The photoelectric cell would therefore have to be arranged at 11, while in the other case, it may be arranged at 12. As the photoelectric cell when arranged at 11 is located at a greater distance from the light admission opening than when it is arranged at 12, it is therefore less strongly illuminated at 11 than at 12. The ratio between the intensity of illumination on the photoelectric cell at 11 and that at 12 is approximately inversely proportional to the ratio between the square of the distance $d$ and the square of the reduced distance $e'$. The reduced distance $e'$ is calculated according to the Gullstrand law by dividing the distance $e$ by the coefficient of refraction of the medium (i. e. of the Plate 2). The reduced distance $e'$ is thus obtained from the formula $$e' = \frac{e}{n}$$

The degrees of illumination in the planes 12 and 11 are thus in the ratio of $d^2$ to $e'^2$. If, for example, the distance $d=47$ (in any units) and the distance $e=32$, so that $e'=21$, then $$d^2 : e'^2 = 47^2 : 21^2 = 2209 : 441,$$

i. e. the degree of illumination at 12 is about five times as large as at 11. By this calculation only approximately correct figures are abtained, but it has been found that they agree very well with the figures obtained in practice.

From the foregoing, it will be seen that the degree of illumination on the photoelectric cell obtained by the use of the lens plate is considerably greater than when only chambers are arranged in front of the photoelectric cell, as was hitherto the case. The screening effect in respect to rays of too great an inclination is existent both in the lens plate and in the chamber screening device. The lens plate operates, however, from the practical point of view differently, inasmuch as it utilizes almost without loss all the rays incuded in a light cone of definite angular magnitude, while in the case of the chamber screening device, only those rays which are exactly axial can be fully utilized, the rays coming from the sides being screened off to a greater or less extent by the partitions of the chambers. By the use of the lens plate, all the permissible rays are thus utilized and only the undesired rays are screened off, whereas in the case of the chamber screening device only a part of the permissible rays is utilized, while the permissible inclined rays coming from the object to be photographed are unnecessarily screened off to a greater or less extent according to their inclination and therefore are not measured.

The lens surface may be spherical or aspherical. In Figs. 9 and 10, for example, a rear surface 6 of aspherical form is shown.

It is also possible to use refracting surfaces of a different kind arranged adjacent to one another, such as cylindrical or prismatic surfaces.

The invention may also be applied in the manner illustrated in Fig. 11 wherein two lens plates 15, 16 are arranged in front of the photoelectric cell.

The lens plate may be made of pressed glass or other suitable material. It is particularly advantageous to make it of transparent organic material such as, for example, artificial resin, Celluloid-like material, or hardened gelatine, inasmuch as the lens elements may be produced particularly sharply and accurately in such material. The comparatively small lens elements cannot be manufactured so well with the necessary accuracy from pressed glass.

The depressions or channels in the transparent lens plate may also be arranged on the front side instead of on the rear side. The lens surfaces on the rear side of the plate will then form preferably concave planes.

Figure 13:
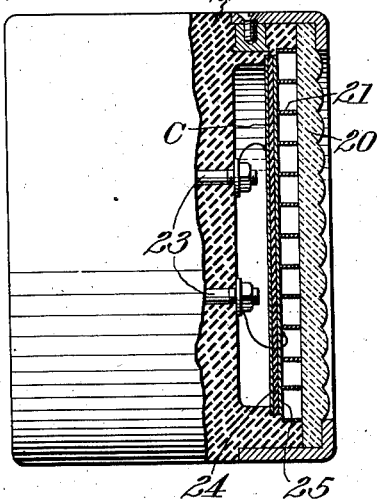
Fig. 13 is a side elevation, with parts in section, of the same.

A convenient structural arrangement for a complete photometer or exposure meter is illustrated in Figs. 12 and 13. The particular light-restricting means illustrated in these views combines a lens plate 20 of the plano-convex type shown in Figs. 4 and 6 with a separate baffle chamber or compartment structure 21 such as shown in Figs. 1 and 3. These elements and the current-generating photoelectric cell C are mounted at one end of the cylindrical casing 22 which houses a sensitive electrical measuring instrument that has terminals 23 connected to the back electrode 24 and outer electrode 25, respectively, of the photocell C. The pointer P and scale plate S of the instrument are visible through an opening in the other end of the casing 22. It is to be understood that various forms of light-restricting means such as shown in Figs. 1 to 11, inclusive, may be incorporated in structures of the general type shown in Figs. 12 and 13.

If the lenses are not formed by a plate but represent single lenses, these single lenses may be kept in position by a plate of non-transparent material or other mechanical means, or the lenses may be located more remote from each other in front of single photoelectric cells which are apart from each other, but form an electric unity. This latter arrangement may be useful and preferred under certain conditions, for example, in order to supply a photographic or cinematographic camera with it, because every spare place of it may be made use of by single lenses before single photocells, the latter forming an electric unity.

Figure 14:
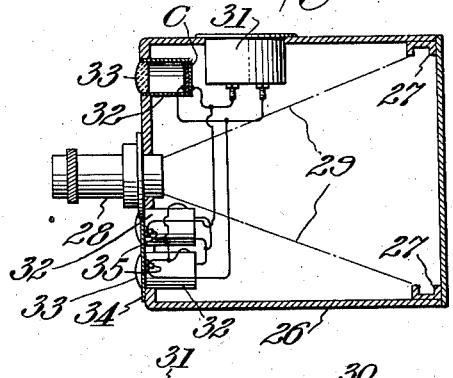
Fig. 14 is a sectional view, as taken on line 14—14 of Fig. 15, of a camera which includes an exposure meter.
Figure 15:
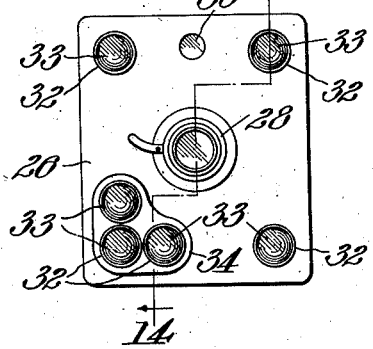
Fig. 15 is an end elevation of the same.

A combined camera and exposure meter which includes a plurality of separate cells is illustrated in Figs. 14 and 15. The camera casing 26, the guides 27 for a film or plate holder and the lens and shutter structure 28 may be of any appropriate form and, as shown by the broken lines 29, there is a substantial space within the camera casing which is not traversed by the light rays which form the image upon the negative. The lens 30 of the view finder is located in this space, and also a plurality of photocell units 20 which are all electrically connected in parallel to the measuring instrument 31. Each cell unit includes a photocell C and light-restricting means such as a tube 32 which forms a chamber having a cross-section substantially corresponding to the shape and size of the outer electrode of the cell, and a lens 33 which extends across the entire outer end of the tube. Certain of these units are shown as separately secured to the camera casing 26 and others are shown as mounted upon an opaque mounting plate 34 which is fixed to the camera casing. When a plurality of units are mounted on a single plate, the electrical connections of the several photocell units may be simplified by connecting all units to a single set of terminals 35, which terminals are in turn connected to the instrument 31.

Figure 16:
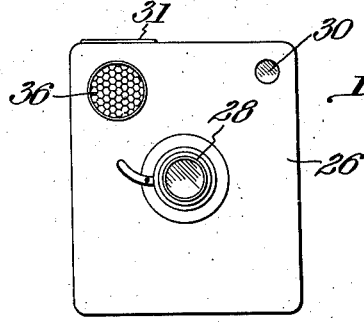
Fig. 16 is an end elevation of a camera provided with an exposure meter having a lens plate of the general type shown in Figs. 1 to 9 and 11.

As shown in Fig. 16, a single assembly 36 of a plurality of lenses may be used when the camera casing is of such design as to provide ample clear space for a single photocell assembly having a current output sufficient to actuate the measuring instrument 31. The cell and light-restricting means may take any of the described forms.

Each of the illustrated forms of the invention is distinguished from the previously suggested arrangement of a single lens by the fact that the novel optical systems provide an exceedingly compact assembly of high current output. According to the prior proposals, the lens of the exposure meter simulated the lens of the camera and formed an image of the scene on the photoelectric cell. Devices of this type are of relatively large size and the conversion of light energy into electrical energy, per unit area of the photocell, is inefficient. The lens or lens and baffle chamber system of this invention provides a high current output per unit cell area, since the active area of the cell or cells and the area of light-admitting opening or openings are substantially equal and the cell or cells are closely adjacent the opening or openings. The invention therefore decreases the size of the photoelectric system of the photometer and also increases its efficiency.

It is to be noted that action of the multiple lens plate is not dependent upon the formation of images upon the cell and that, whether used alone or in combination with a multiple compartment baffle, the light-restricting system is of substantially less axial length than in any prior constructions. The lenses are preferably formed as a single pressed plate which is of transparent material when used for visible light rays or of non-transparent material when used for non-visible rays, such as infra-red or ultra-violet rays.

The principal advantage of the lens plate is that the total quantity of light reaching the cell from the predetermined cone of light is many times greater than the total quantity when the light-restricting system is formed as a multiple chamber baffle. When the lens plate is so designed that a mechanical baffle is unnecessary, the construction is simplified and a further increase in the total quantity of light is obtained. The lens plate may be very thin so that a complete photometer may be of very flat construction and easily transported, or the photometer can be arranged in or on a camera without substantially increasing the bulk of the latter. The flat construction of the light-restricting system makes it possible, without increasing the total bulk above that of prior photometers, to increase the cell area and thus obtain a further increase in the efficiency of the photometer.

While the reduction in size, with an accompanying increase in the efficiency, is particularly striking when a multiple lens plate is used with or as a substitute for a multiple compartment screen, the invention is also applicable to photometers of the type in which only a single compartment is used to screen undesired rays from the cell. The length of the lens and baffle chamber combination is substantially less than that of known arrangements in which a cell of the same size as the lens is placed at the focal plane of the lens. For the same angular spread equal to about the image angle of the average camera, the image-forming lens of the prior constructions is much larger than the lens contemplated by this invention and must be spaced at a greater distance from the cell.

In the diagrammatic view, Fig. 17, the solid lines represent the construction required, and the paths of light rays, when the walls of a tubular chamber constitute the only light-restricting means, and the dotted lines indicate the changes in construction, also the paths of rays, when the lens is added. When the cell C is located at the bottom of a chamber formed by the tubular walls 38, and parallel light rays $a$, $b$, $c$ that make the maximum permissible angle $\alpha$ to the axis A—B, it is apparent that the cell C must be spaced so far from the open end of the tubular chamber that ray $a$ touches the junction of the cell and the lower wall 38. With the cell thus located at the plane EE, rays passing through the open end of the chamber at an angle greater than $\alpha$ will strike the lower wall. The length of the chamber will be greater than the diameter or height in the case of a camera image angle of less than 45°.

According to the invention, a lens 39 is arranged across the open end of the chamber to cooperate with walls 38 to restrict the angular spread of the active cone of light rays. The lens may be a simple plano-convex lens having a focal plane FF that lies beyond plane EE and, both for economy and greater efficiency, the lens is preferably non-aplanatic. Certain optical effects permit movement of the cell C forward to a point much closer to the open end of the chamber. If the lens 39 were aplanatic, the rays $a$, $c$ would be refracted as shown by broken lines $a_1$, $c_1$ but, due to the spherical aberration of a heavily curved lens causes the rays to take the paths indicated by dotted lines $a_2$, $c_2$, respectively.

The cell C may now be moved forward to plane E'E', i. e. the intersection of refracted ray $a_2$ with the lower wall 38. Designating the distance from lens 39 to planes EE and E'E' as M, N, respectively, it can be shown by mathematical analysis that the relative light intensities at these planes correspond very closely to the ratio of $N^2$ to $M^2$. If, for example, M is equal to 5.5 cm. and N is equal to 3 cm., the ratio is $$\frac{M^2}{N^2}=\frac{5.5^2}{3^2}=\frac{30.25}{9}>3$$

In other words, the combination of the lens and baffle chamber increases the light intensity to more than three times the value obtained when the chamber is used alone to restrict the beam to the same cone of light rays.

The reasons for this optical effect will be apparent from an examination of Figs. 18 and 19 which show, repectively, a simple chamber formed by walls 38, and a lens 39 across the end of a shorter chamber formed by walls 38. The beam of light represented by parallel rays $d$, $e$, $f$ is inclined at somewhat less than the maximum permitted angle $\alpha$ which is indicated, as before, by ray $a$. When the lens is not present, only the portion 41 of the total beam width 42 falls upon the cell C, at region 41', Fig. 18, but with the lens 39, all of the rays are collected and reach the cell. Ray $f$ is sharply refracted by the lens in accordance with the sine law of refraction or spherical aberration of the lens so that even the lower part of the beam 42 is conducted to the cell.

It is usually desirable to have the lens of the same size as the cell as it is convenient to use a cylindrical chamber. The lens may be of somewhat larger diameter, but, preferably, should not be of substantially smaller size if the requirements of small size and large current output are to be satisfied. The lens is of less size than those required to focus an image on the cell, and the chamber length is much shorter than in the prior constructions, i. e., of a length less than the diameter of the lens. Damage to the cell is prevented by locating the cell in front of the focal plane of the lens as it is impossible to concentrate sunlight on the cell surface.

One practical embodiment of the invention is shown in Fig. 20. The lens 39 is carried by a tube 43 which telescopes over the tubular shell 44 in which a measuring instrument 45 is mounted. False indications due to a failure to move the lens outward into predetermined relation to the stationary cell C are avoided by an automatic switch which breaks the circuit between cell C and the instrument except when the tube 43 is fully extended. As illustrated, the switch may include a spring contact 46 which moves outward to engage contact 46' as soon as the tube 43 clears the button 47 that is mounted on the contact 45.

The photometer shown in Fig. 21 is of compact size, as compared with prior tubular shield constructions, due both to the use of lens 39 with the chamber walls 38' and to the location of cell C within the circular magnet 48 of the measuring instrument. The moving coil 49 of the instrument carries the pointer 50 which moves over a scale plate 51, and the entire assembly is housed within the instrument casing 52.

The front view of the instruments shown in Figs. 20 and 21 may be substantially the same as that illustrated in Fig. 12.

Although the devices according to the invention are particularly important for application in the type of photometers which are most used, namely photographic exposure meters for determining the time of exposure for still photography or the size of the diaphragm for cine photography, it can nevertheless also be used for other photometers for the measurement of the illuminating power of the light which is included in a cone of rays of a definite magnitude, for example for luxmeters.

This application is a continuation-in-part of my copending applications Ser. No. 728,573, filed June 1, 1934, on which Patent No. 2,067,843 has been issued, and Ser. No. 747,463, filed Oct. 8, 1934.

So far as I am aware, it is broadly new to restrict the angular spread of the cone of light rays reaching the cell of a photometer by means of an optical system which does not produce an image upon the cell, and it is also new to use such an optical system in combination with a mechanical light-intercepting baffle of either the single or multiple chamber type. It is therefore to be understood that the several embodiments of the invention herein illustrated and described are typical of the invention but that various changes may be made in the physical design and relationship of the parts without departing from the spirit of my invention as set forth in the following claims.

I claim:

1. In a photometer of the type including a photocell and a galvanometer, the combination with a chamber defined by a substantially tubular wall, a photoelectric cell extending substantially completely across the inner end of the chamber, and a lens at the open front end of said chamber and cooperating with said chamber wall to restrict the angular spread of light rays reaching said cell, said chamber having a length substantially less than the focal length of said lens, whereby said photocell is located substantially in front of the focal plane of the lens.

2. A photometer as claimed in claim 1, wherein said lens comprises a single non-aplanatic lens.

3. In an exposure meter, the combination with an electrical measuring instrument, and a photoelectric cell, of wall means defining a tubular chamber having a cross-section conforming substantially to the size and shape of that portion of the cell which is to be illuminated, said cell extending across the tubular chamber at a point spaced from the open end thereof, and a lens at the outer end of said chamber, said lens having a focal plane which lies substantially beyond said cell.

4. An exposure meter as claimed in claim 3, wherein said lens is a single non-aplanatic lens having a diameter substantially greater than the length of said chamber.

5. An exposure meter as claimed in claim 3, wherein said tubular chamber is slidably mounted to telescope upon said measuring instrument, and said cell is supported in fixed position with respect to said measuring instrument.

6. An exposure meter comprising a casing having an opening at opposite faces thereof, an electrical measuring instrument completely enclosed within said casing and including a permanent magnet and a moving coil system, a pointer carried by said movable coil system, a scale visible through one casing opening for cooperation with said pointer, a photoelectric cell positioned within said casing adjacent the side of said scale plate opposite the sight opening therefor, said cell being adjacent and substantially surrounded by said magnet, and a lens at the other casing opening to restrict the angular spread of light rays reaching the cell through said other opening to a predetermined value, said lens being spaced from said cell by a distance substantially less than the focal length of said lens.

7. A photoelectric photometer having a casing, and a chamber provided with a photocell on its bottom and carrying a lens in its front opening, and a galvanometer, such chamber being made in the shape of a tube, and said tube being made slidable backwards and forwards upon said casing, thereby allowing the lens carried by said tube to be brought into proper position, and a switch device in the nature of a button on the wall of said casing and adapted to automatically close the electric circuit between the ammeter when said tube with the lens is pulled out, and to automatically disconnect the circuit of the ammeter when said tube with the lens is pushed back.

8. A photoelectric meter comprising a casing having opening at opposite faces thereof, an electrical measuring instrument having a scale and pointer adjacent one face of the casing and visible through the opening thereof, a moving coil system supporting said pointer, a permanent magnet having a gap in which said moving coil is pivoted, a tubular chamber within said casing and extending into said magnet from the opening at the other face of said casing, a photocell at the base of said chamber, and a lens extending across the outer end of said chamber, said lens having a focal length substantially greater than the length of said chamber.

9. An electrical exposure meter assembly adapted to be mounted on a camera, said assembly comprising an electrical measuring instrument, a plurality of photoelectric cells of the current generating type, circuit elements for connecting the several cells in parallel to said instrument, and means cooperating with said cells to form a plurality of photocell units for separate mounting in spaced relation on the front wall of a camera; said means including for each photocell unit a tubular chamber having the associated cell extending substantially completely across the inner end of the chamber, and a lens at the open front end of the chamber, said lens having a focal length substantially greater than the length of the chamber.

HANS FERDINAND TÖNNIES.